United States Patent [19]

Barthelmess

[11] Patent Number: 5,025,930
[45] Date of Patent: Jun. 25, 1991

[54] CENTRIFUGAL CLASSIFIER

[75] Inventor: Ulrich Barthelmess, Niederstotzingen, Fed. Rep. of Germany

[73] Assignee: OMYA GmbH, Cologne, Fed. Rep. of Germany

[21] Appl. No.: 180,088

[22] Filed: Apr. 11, 1988

[30] Foreign Application Priority Data

Apr. 10, 1987 [DE] Fed. Rep. of Germany ....... 3712136

[51] Int. Cl.$^5$ ............... B04B 5/08; B04B 7/00; B01D 45/14; F16C 32/06
[52] U.S. Cl. ..................... 209/144; 55/408; 277/3; 277/DIG. 5; 310/90.5; 384/111; 415/171.1; 416/174
[58] Field of Search ............. 209/133, 142–144, 209/210, 211; 55/406, 408; 210/512.3; 277/3, DIG. 5; 384/107, 111, 118, 134; 310/90.5; 415/120, 171.1, 170 B, 175; 416/174 R

[56] References Cited

U.S. PATENT DOCUMENTS

| 2,276,761 | 3/1942  | Carey          | 209/144     |
| 2,526,594 | 10/1950 | Voysey         | 415/175 X   |
| 2,736,265 | 2/1956  | Higgins        | 415/175 X   |
| 3,040,888 | 6/1962  | Hosokawa et al.| 209/144     |
| 3,272,899 | 9/1966  | Warnery        | 277/3       |
| 3,341,173 | 9/1967  | Garrett        | 384/134 X   |
| 3,384,238 | 5/1968  | Alpha          | 209/144 X   |
| 3,498,453 | 3/1970  | Kaiser et al.  | 209/144     |
| 3,651,941 | 3/1972  | Imris          | 209/144 X   |
| 3,785,128 | 1/1974  | Redemann       | 55/406 X    |
| 3,998,502 | 12/1976 | Walter et al.  | 384/107     |
| 4,239,422 | 12/1980 | Clancey        | 277/3 X     |
| 4,257,880 | 3/1981  | Jones          | 209/144     |
| 4,292,172 | 9/1981  | Hosokawa et al.| 209/144     |
| 4,786,406 | 11/1988 | Nied et al.    | 209/144     |
| 4,827,169 | 5/1989  | Habermann      | 310/90.5    |

FOREIGN PATENT DOCUMENTS

| 0647888 | 7/1937 | Fed. Rep. of Germany ...... 209/144 |
| 1757582 | 7/1975 | Fed. Rep. of Germany . |
| 2951819 | 9/1982 | Fed. Rep. of Germany . |

Primary Examiner—Margaret A. Focarino
Assistant Examiner—Edward M. Wacyra

[57] ABSTRACT

A centrifugal classifier comprising a housing, which is provided with inlets for material to be classified and classifying air or with an inlet for material to be classified and classifying air and with outlets for fines and for coarses, and at least one rotor, which essentially consists of an annular series of blades and is movably mounted in the housing. The rotor is movably mounted in the housing by at least one bearing, which is adapted to be purged by a fluid and which serves also as a seal between the rotor or rotor shaft and the housing.

9 Claims, 4 Drawing Sheets

CENTRIFUGAL CLASSIFIER

BACKGROUND OF THE INVENTION

This invention relates to a centrifugal classifier comprising a housing, which is provided with inlets for material to be classified and for classifying air or with an inlet for material to be classified and for classifying air and with outlets for a mixture of classifying air and fines and for coarses, and at least one rotor, which essentially consists of an annular series of blades and is movably mounted in the housing. Such classifier are already known from German Patent Publication No. 1757 582 or from German Patent Specification No. 29 51 819.

In the known classifiers the rotor shaft is movably mounted in the housing or frame by means of sliding surface bearings or rolling element bearings. The bearings must be lubricated and must be protected from an ingress of particles. On the other hand, an ingress of lubricant particles into the product must be prevented. For this reason the bearings must carefully be separated from the set of rotor blades and from the production space proper and must be sealed or encapsulated. Said measures are expensive. In particular, they add to the weight of the machine and involve a larger space requirement, particularly in an axial direction. In the conventional design the shaft is movably mounted in two axially spaced apart bearings, which are disposed outside the housing between the basket of the classifier and the drive. The shaft must be sealed where it extends through the housing in order to prevent a sucking of extraneous air from the outside and an ingress of foreign particles. That seal between the housing and the shaft increases the distance between the basket of the classifier and the bearing on the outside of the housing so that the thickness of the shaft is increased and two axially spaced apart bearings are required to ensure the required stability.

In view of the above it is an object of the invention to provide centrifugal separators which are of the kind defined and in which a separate seal between the shaft and the housing is not required and a shorter shaft may be used so that their axial extent is reduced.

How that object can be accomplished is as follows: The rotor shaft is movably mounted in the housing, particularly in the end wall of the housing, by means of at least one bearing that is adapted to be swept by a fluid and serves also as a seal between the rotor and the housing. A separate seal is not required due to the fluid which is required for the operation of the bearing and the ambient atmosphere. It will be understood that the fluid is compatible with the working fluid or with the product contained in the interior of the housing and usually consists of air or an inert gas. The fluid may be supplied in a liquid state and may be evaporated in the sealing or bearing gap so that the bearing is cooled at the same time.

Numerous further designs and variations may be adopted. A single bearing, which is disposed between the rotor blade basket and the drive and is mounted in the end wall of the housing, may be sufficient. Alternatively, one bearing mounted in the end wall of the housing may be supplemented by another bearing, which may be a conventional lubricated bearing or also a lubricant-free fluid bearing. In the latter case, both bearings may be mounted in a common bearing housing so that the seal against the ambient atmosphere is effected in two stages and is thus facilitated.

In a further embodiment, a bearing between the rotor shaft and the end wall of the housing is provided as well as a further lubricant-free bearing, which is disposed between the outlet for fines and classifying air and an end ring of the rotor.

In a particularly compact arrangement the drive motor is accommodated in a motor housing, which is axially attached to the housing of the classifier or the motor is flanged to said motor housing and two lubricant-free bearings are provided, which consist of a bearing disposed between the basket of the classifier and the motor and a second bearing mounted on that end wall of the motor housing which is remote from the basket of the classifier. In that case the rotor of the motor is additionally cooled and protected from foreign matter by the sealing fluid.

Aerostatic or inert gas-static bearings may be used as well as electromagnetic bearings which are flown through by a sweeping or sealing fluid. Whereas electromagnetic bearings are more expensive, an electric motor drive may be integrated in or attached to the electromagnetic bearing.

It may be pointed out that the invention may be utilized to the same advantage not only in centrifugal classifiers but also in other machines in which a rotor must movably be mounted in the housing in such a manner that the rotor is sealed from the housing and from internal fixtures in the housing, on the one hand, and from the ambient atmosphere, on the other hand. This will be applicable to fans and blowers as well as to pumps for handling certain fluids without contamination.

BRIEF DESCRIPTION OF THE DRAWINGS

Illustrative embodiments of the invention will now be explained with reference to the drawing.

DESCRIPTION OF THE PREFERRED EMBODIMENTS

Figure 1:
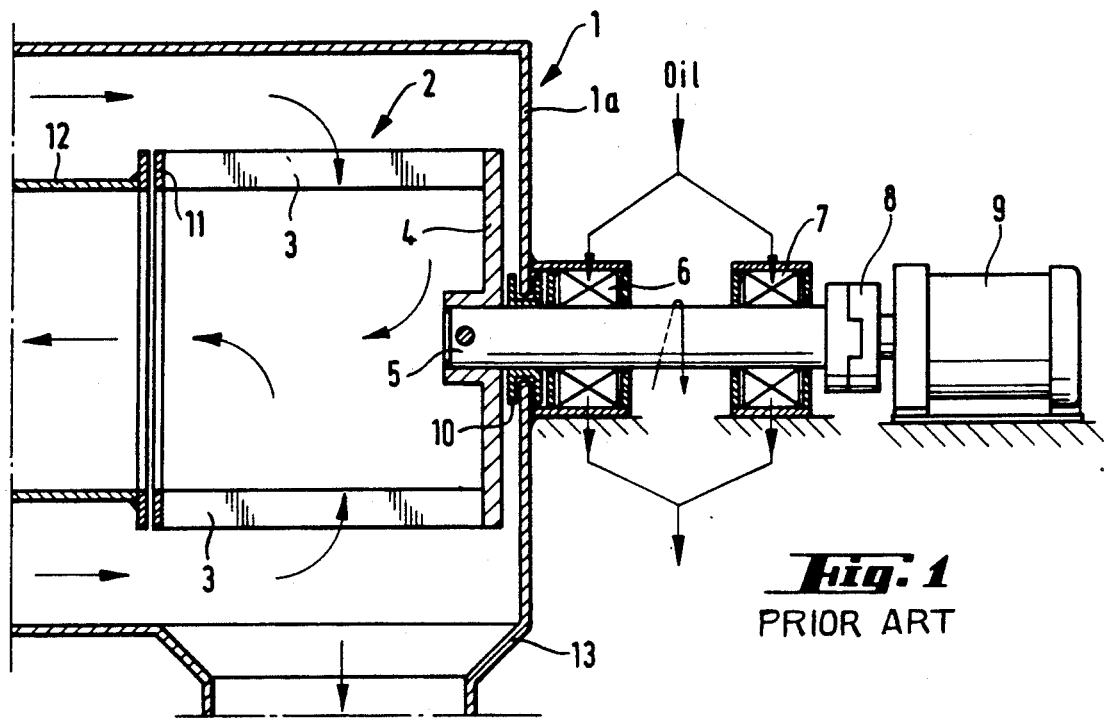
FIG. 1 is a diagrammatic longitudinal sectional view showing for a comparison the conventional design of classifiers having lubricated bearings which are spaced from the housing of the classifier.

In accordance with FIG. 1, a housing 1 accommodates a rotor 2, which specifically constitutes a rotor of a classifier. The rotor 2 essentially consists of an annular series of blades 3, which are mounted on the periphery of a disc 4, which is secured to a shaft 5. The shaft 5 is movably mounted by means of two conventional lubricated sliding surface or rolling element bearings 6, 7.

The bearings 6, 7 are disposed beside the end wall 1a of the housing at an axial distance therefrom which is sufficient for the required stability. The shaft 5 and the rotor 2 are driven via a coupling 8 by an electric motor 9. A seal 10 is required to seal the shaft where it extends through the housing. At that end which is opposite to the disc 4 the blades 3 are interconnected by a ring 11, which is axially succeeded by a suction pipe 12, which constitutes the outlet for fines and classifying air.

The annulus between the suction pipe 12 and the shell of the housing 1 constitutes an inlet for material to be classified and classifying air (see the flow arrows).

An outlet 13 for coarses is provided on the underside of the housing.

Figure 2:
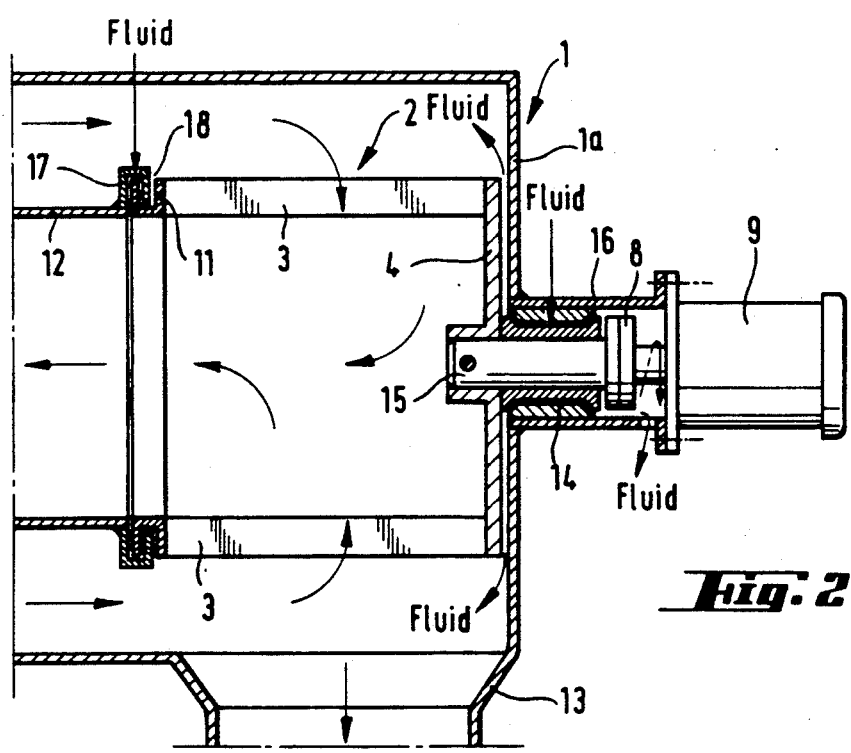
FIG. 2 is a similar view showing a first illustrative embodiment of the invention.

As is apparent from FIG. 2, a fluidostatic bearing 14 is provided in accordance with the invention between the end wall 1a of the housing and the rotor shaft 15. That bearing and the bearing fluid act also as a seal and as a sealing fluid (see the fluid arrows) so that a separate shaft seal as is provided in accordance with FIG. 1 between the housing and the shaft is not required. As a result, the distance between the rotor 2 and the bearing 14 is reduced at least by the axial length of the shaft seal previously provided. As a result, the shaft 16 is correspondingly shorter and may be smaller in diameter so that a second bearing is not required. The classifier is compact and has a short axial length. The machine is robust and reliable in operation, particularly because the bearing 14 contains no lubricant.

The fluid bearing 14 is contained in a cylindrical housing 16, which is attached to the end wall 1a of the housing and which accommodates also the coupling 8. The motor 9 is flanged to the housing 16.

A channel-shaped ring 17 is mounted on the suction pipe 12 (or on the inner tube of the housing) and extends into a groove 18 of the ring 11, by which the blades 3 of the classifier are interconnected at their free end. That design results in a particularly effective seal between the suction pipe 12 and the rotor 2 and provides a support for the rotor 2 at that end which is opposite to the shaft bearing 14.

Figure 3:
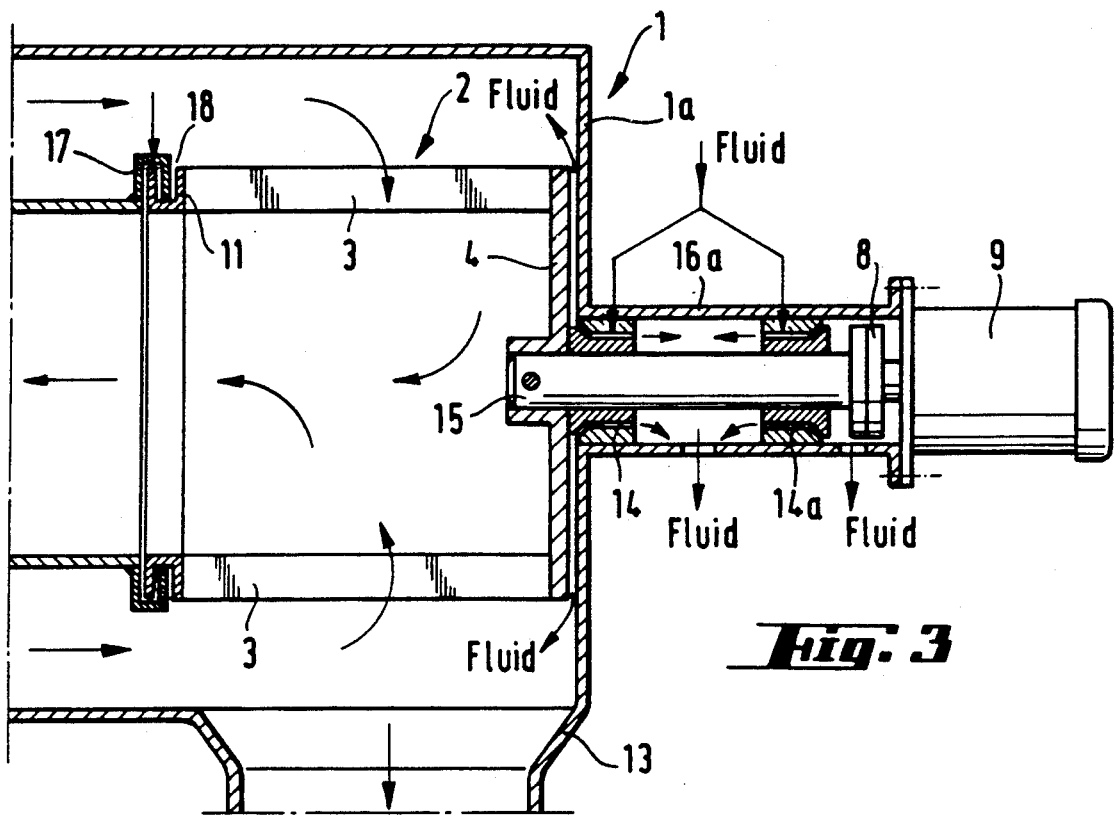
FIGS. 3 to 7 show further embodiments.

Particularly for high throughput rates, a second bearing for the rotor shaft may optionally be provided. That bearing may consist of a conventional bearing but preferably consists of another fluidostatic bearing 14a, as is shown in FIG. 3. The two bearings are mounted in a common bearing housing 16a, which is attached to the end wall 1a of the housing. The two bearings 14, 14a have respective beveled shoulders for an axial guidance in both directions. (The single bearing in FIG. 2 has two beveled shoulders.)

Figure 4:
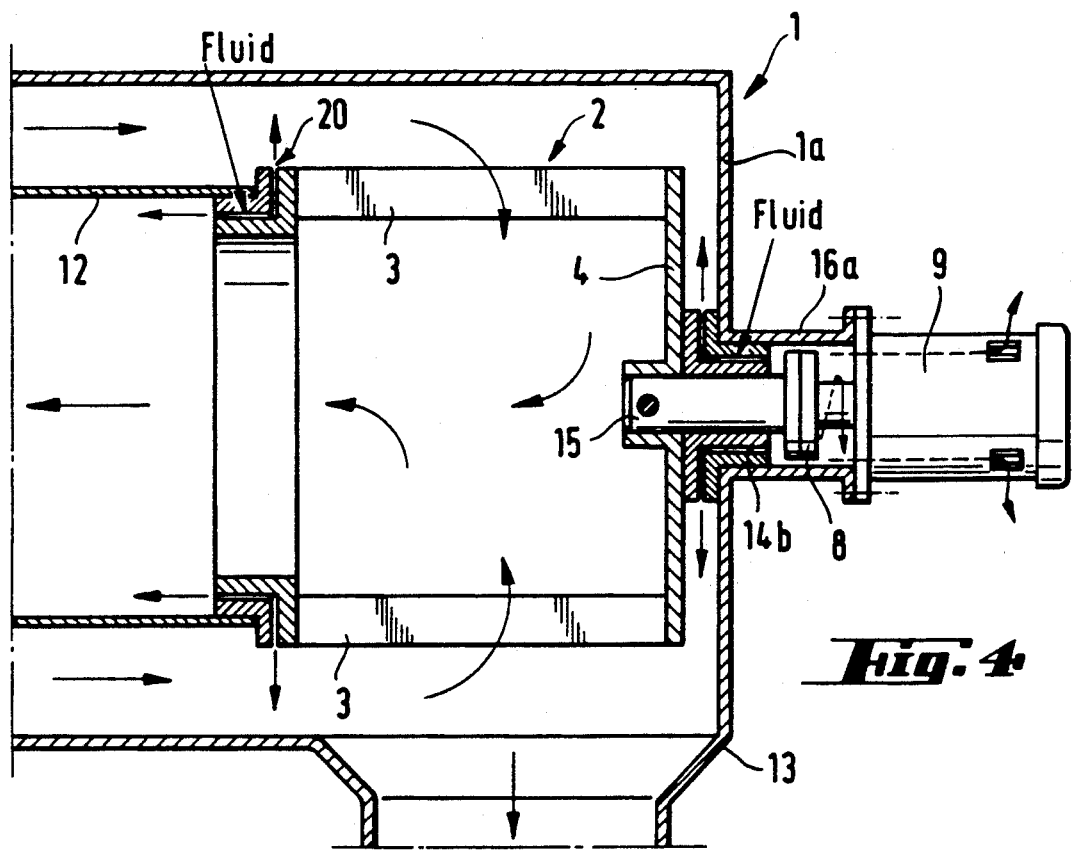

The embodiment shown in FIG. 4 also comprises only one bearing 14b, which is operated with a sealing fluid and provided in the housing end wall 1a.

That fluid bearing 14b consists of a radial part and an axial part. The fluid gas which axially leaves the bearing is conducted through the motor and is discharged through the ventilation slots provided at the rear end.

Another fluidostatic bearing 20 is disposed between the suction pipe 12 and the rotor 2 and is also used to seal. This results in a particularly compact design and a particulary good mounting arrangement, which prevents vibrations of the rotor so that the rotor has an improved strength and safety whereas the weight is reduced.

The fluid bearing 20 also consists of an axial part and a radial part.

Figure 5:
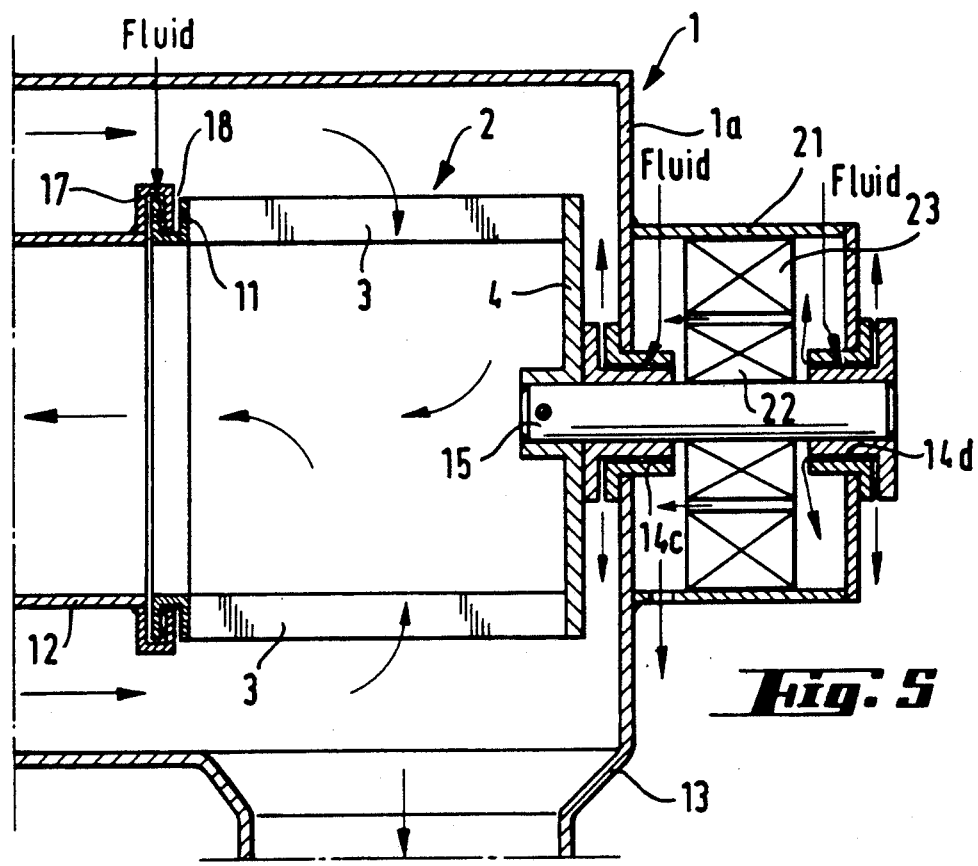

The invention provides a basis for other designs too, e.g., for the design shown in FIG. 5.

The drive is mounted in a separate housing 21, which is axially attached to the classifier housing. The rotor 22 of the motor is mounted directly, without an interposed coupling, on the rotor shaft 15. The rotor shaft 15 (or motor shaft) is movably mounted by means of two fluidostatic bearings 14c, 14d, which are mounted in the associated housing end walls and also serve to seal. The stator 23 of the motor is attached to the shell of the motor housing.

Figure 6:
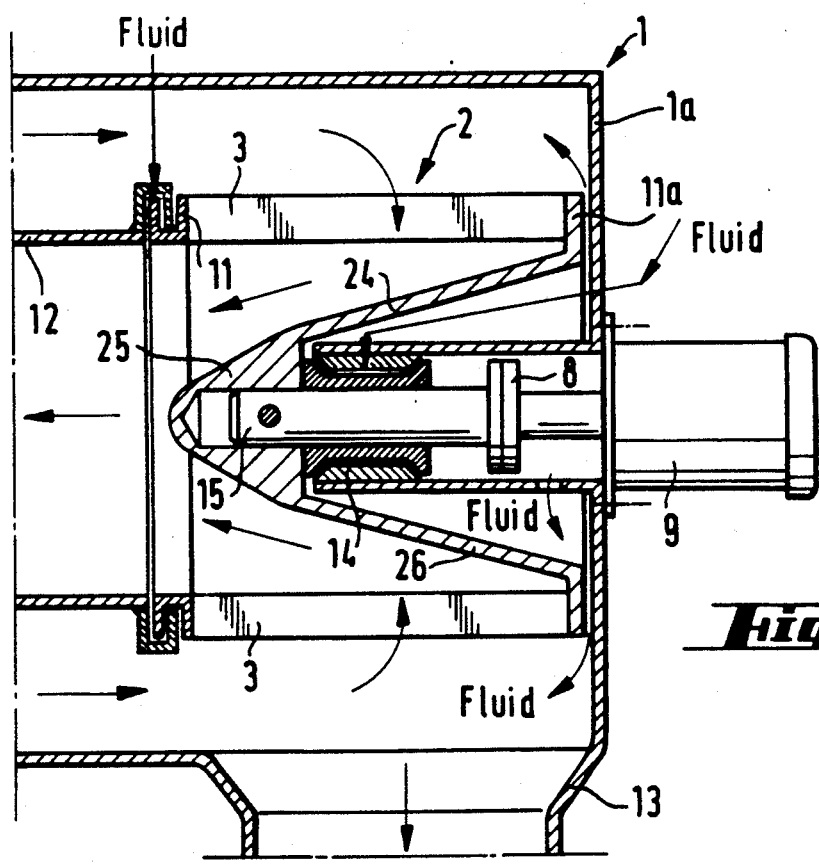

In the embodiment shown in FIG. 6 the rotor is mounted inside the space which is defined by the flight circle of the rotor blades rather than outside said space. The disc 4 has been replaced by a hollow-conical member 24, which at its axially inner, small end constitutes a hub 25 for the rotor shaft. The shaft 15 is movably mounted by means of a preferably fluidostatic bearing 147 in a bearing bushing 26, which is attached to the housing end wall 1a and extends into the hollow-conical member 24.

As a result, the bearing 14 is disposed at the center of gravity of the rotor so that the tilting moment that is due to the weight of the rotor is avoided. Because the hollow-conical member 24 tapers in the direction of flow (see the arrows), the flow within the rotor will not be disturbed and the flow which radially enters between the classifier blades 3 is deflected into the axial direction by the smooth outside surface of the hollow-conical member 24 with low turbulence.

The bearing bushing 26 contains also the coupling 8; the motor 9 is flange-connected on the outside. Alternatively, the drive may be designed to be accommodated within the hollow-conical member 24 or the bearing bushing 26 in an arrangement which is similar to that shown in FIG. 5.

Figure 7:
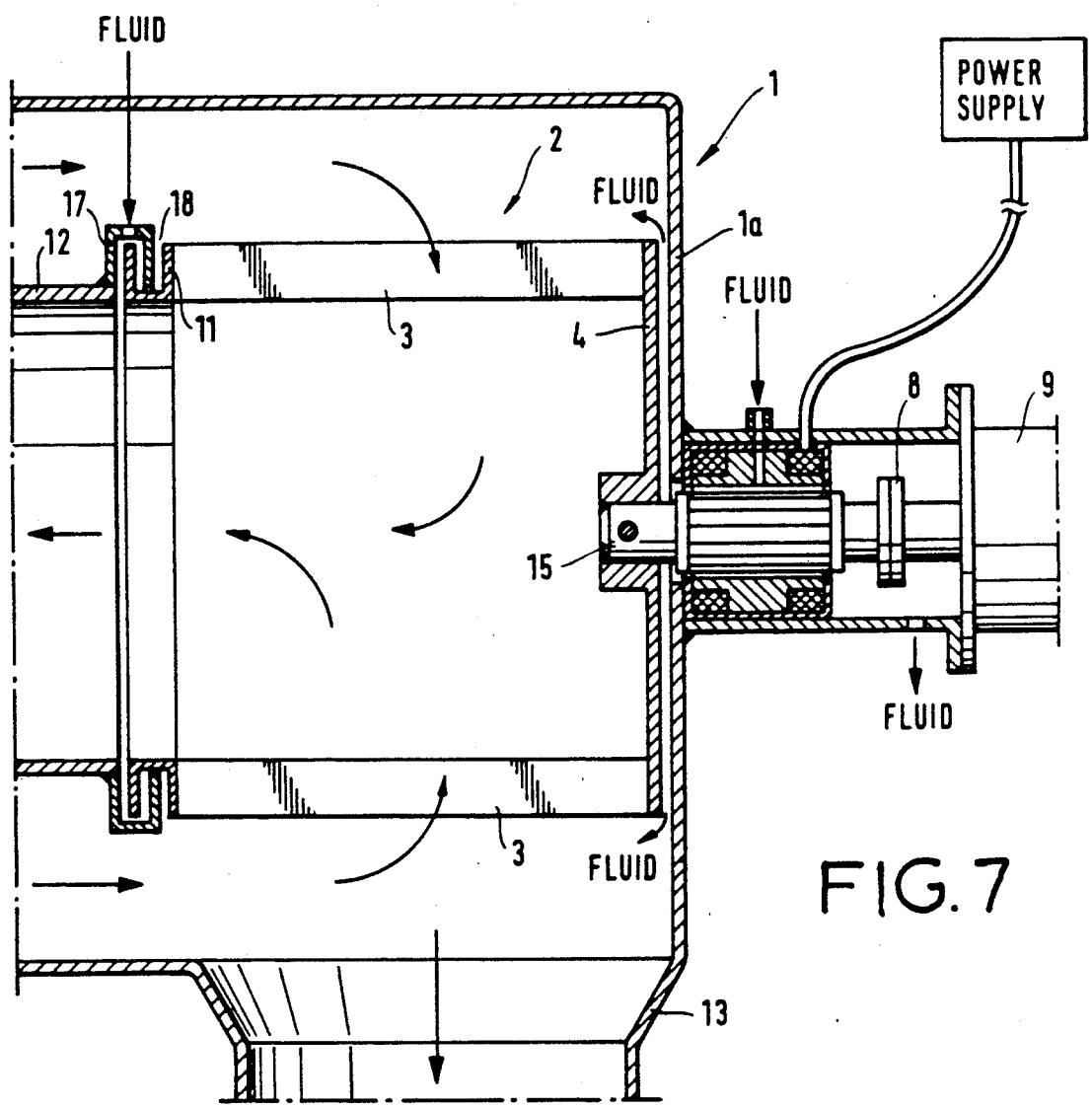

FIG. 7 illustrates an embodiment with an electromagnetic bearing and a power supply therefor.

I claim:

1. A centrifugal classifier comprising: a housing having inlet means for material to be classified and for clasifying air and also having first outlet means for a mixture of classifying air and fines and second outlet means for coarses; at least one rotor comprising blade means; and fluid bearing means rotatably supporting said at least one rotor in said housing and also having passage means adapted to be swept through by a fluid from outside said housing into said housing to form a seal between said housing and the outside, said first outlet means comprises a suction pipe, and a labyrinth seal between said suction pipe and said at least one rotor.

2. A centrifugal classifier according to claim 1, wherein said fluid bearing means are aerostatic bearing means.

3. A centrifugal classifier according to claim 1, wherein said fluid bearing means are bearing means operated by inert gas.

4. A centrifugal classifier according to claim 1, wherein the fluid is a liquid having an evaporation temperature corresponding to an operational temperature of the bearing means.

5. A centrifugal classifier according to claim 1, wherein said bearing means are electromagnetic bearing means.

6. A centrifugal classifier according to claim 1, wherein said at least one rotor comprises a ring attached to said blade means, said ring forming a peripheral groove, said suction pipe comprising a ring received in said peripheral groove.

7. A centrifugal classifier according to claim 1, wherein said fluid bearing means comprises two fluidostatic bearings, and electromagnetic drive means for said rotor, said drive means comprising a rotor located between said two bearings, and a stator mounted to said housing.

8. A centrifugal classifier comprising: a housing having inlet means for material to be classified and for classifying air and also having first outlet means for a mixture of classifying air and fines and second outlet means for coarses; at least one rotor comprising blade means; and fluid bearing means rotatably supporting said at least one rotor in said housing and also having passage means adapted to be swept through by a fluid from outside said housing into said housing to form a seal between said housing and the outside, said first outlet means comprising a suction pipe, and a fluidostatic bearing arranged between said suction pipe and said at least one rotor.

9. A centrifugal classifier comprising: a housing having inlet means for material to be classified and for classifying air and also having first outlet means for a mixture of classifying air and fines and second outlet means for coarses; at least one rotor comprising blade means; and fluid bearing means rotatably supporting said at least one rotor in said housing and also having passage means adapted to be swept through by a fluid from outside said housing into said housing to form a seal between said housing and the outside, said at least one rotor comprising a ring, a cone extending inwardly from said ring into said at least one rotor, said cone having an end constituting a hub for a shaft of said at least one rotor, a bearing bushing attached to an end wall of said housing and extending into the cone, and a bearing rotatably mounting said rotor shaft in said bearing bushing, said last mentioned bearing being attached substantially at the center of gravity of the at least one rotor.

* * * * *